(12) United States Patent
Mikami (10) Patent No.: US 12,510,009 B2
(45) Date of Patent: Dec. 30, 2025

(54) EXHAUST DEVICE

(71) Applicant: KAWASAKI MOTORS, LTD., Akashi (JP)

(72) Inventor: Kohei Mikami, Akashi (JP)

(73) Assignee: KAWASAKI MOTORS, LTD., Akashi (JP)

(*) Notice: Subject to any disclaimer, the term of this patent is extended or adjusted under 35 U.S.C. 154(b) by 0 days.

(21) Appl. No.: 18/918,099

(22) Filed: Oct. 17, 2024

(65) Prior Publication Data
US 2025/0137393 A1     May 1, 2025

(30) Foreign Application Priority Data

Oct. 31, 2023 (JP) ................................ 2023-186785

(51) Int. Cl.
| | |
|---|---|
| *F01N 3/20* | (2006.01) |
| *F01N 13/00* | (2010.01) |
| *F01N 13/08* | (2010.01) |
| *F01N 13/14* | (2010.01) |
| *F01N 13/18* | (2010.01) |

(52) U.S. Cl.
CPC ............ *F01N 3/20* (2013.01); *F01N 13/1838* (2013.01); *F01N 13/008* (2013.01); *F01N 13/08* (2013.01); *F01N 13/141* (2013.01); *F01N 2900/14* (2013.01)

(58) Field of Classification Search
CPC .......... F01N 3/20; F01N 13/008; F01N 13/08; F01N 13/141; F01N 13/143; F01N 13/1805; F01N 13/1838; F01N 13/185; F01N 2450/20; F01N 2450/26; F01N 2470/08; F01N 2560/02; F01N 2900/0416; F01N 2900/14
See application file for complete search history.

(56) References Cited

U.S. PATENT DOCUMENTS

| | | | |
|---|---|---|---|
| 10,619,542 B1* | 4/2020 | Muramatsu | ............... F01N 3/28 |
| 2007/0204597 A1* | 9/2007 | Nakano | ................. F01N 13/008 60/276 |
| 2011/0047998 A1* | 3/2011 | Adachi | ................. F01N 13/008 60/324 |
| 2013/0125533 A1* | 5/2013 | Sullivan | ................. F01N 11/00 60/276 |

(Continued)

FOREIGN PATENT DOCUMENTS

JP       2017-110616 A     6/2017

*Primary Examiner* — Binh Q Tran
(74) *Attorney, Agent, or Firm* — XSENSUS LLP (57) ABSTRACT

An exhaust device includes a catalyst unit, a connection pipe connected to a downstream side of the catalyst unit, an exhaust gas sensor that detects a state of exhaust gas flowing inside the connection pipe, and an outer cylinder that covers an outer periphery of the connection pipe. An upstream end portion of the connection pipe is press-fitted into an outlet of the catalyst unit. The connection pipe is fixed to a first baffle plate around the connection pipe at a position downstream of the upstream end portion. A first opening having an opening diameter larger than an outer diameter of the exhaust gas sensor is formed on a peripheral surface of the connection pipe, and the exhaust gas sensor is fixed to the outer cylinder in a state where a detection portion is inserted into an inside of the connection pipe through the first opening.

20 Claims, 8 Drawing Sheets

(56) References Cited

U.S. PATENT DOCUMENTS

| | | | |
|---|---|---|---|
| 2015/0300233 A1* | 10/2015 | Bowers | F01N 13/008 |
| | | | 60/320 |
| 2016/0216174 A1* | 7/2016 | Cloudt | G01M 15/102 |
| 2017/0363023 A1* | 12/2017 | Arima | F01N 3/24 |
| 2019/0162103 A1* | 5/2019 | Okamoto | F02D 41/3005 |
| 2022/0389854 A1* | 12/2022 | Vaishampayan | F01N 13/082 |

* cited by examiner

EXHAUST DEVICE

CROSS-REFERENCE TO RELATED APPLICATION

The present application claims priority to Japanese patent application JP 2023-186785, filed on Oct. 31, 2023, the entire content of which is incorporated herein by reference in its entirety.

FIELD OF THE INVENTION

The present disclosure relates to an exhaust device in which exhaust gas sensor is disposed downstream of a catalyst unit.

BACKGROUND ART

Conventionally, various exhaust devices each including a catalyst unit having a catalyst for purifying exhaust gas discharged from an engine have been proposed for automobiles, motorcycles, and the like. Some exhaust devices each including a catalyst unit each include an exhaust gas sensor provided in a pipe downstream of the catalyst unit, the exhaust gas sensor detecting an oxygen concentration or the like for detecting a state of the catalyst unit or for other purposes.

In an exhaust device described in Japanese Patent Application Laid-Open No. 2017-110616, a detection portion at a distal end of a downstream oxygen sensor is inserted into a first inner cylinder extending downstream of a catalyst.

SUMMARY OF THE INVENTION

An exhaust device according to one aspect of the present disclosure includes: a catalyst unit having a catalyst that purifies exhaust gas discharged from an engine; a connection pipe connected to the catalyst unit on a downstream side in a flow direction of the exhaust gas; an exhaust gas sensor having a detection portion that detects a state of the exhaust gas flowing inside the connection pipe; and an outer cylinder that covers an outer periphery of the connection pipe, wherein an upstream end portion of the connection pipe is press-fitted into an outlet of the catalyst unit, the connection pipe is fixed to another member around the connection pipe at a position downstream of the upstream end portion, a first opening having an opening diameter larger than an outer diameter of the exhaust gas sensor is formed on a peripheral surface of the connection pipe, and the exhaust gas sensor is fixed to the outer cylinder in a state where the detection portion is inserted into an inside of the connection pipe through the first opening.

DESCRIPTION OF EMBODIMENTS

Hereinafter, an exhaust device according to an embodiment of the present disclosure will be described in detail with reference to the drawings. FIGS. 1 to 5 shows a muffler of a motorcycle as one example of an exhaust device according to the embodiment of the present disclosure. Note that the exhaust device of the present disclosure is widely applied to an exhaust device including a catalyst unit and an exhaust gas sensor, and can be widely applied to an exhaust system of an automobile or the like including an engine.

A muffler 1, which is an exhaust device shown in FIGS. 1 to 5, is connected to an exhaust port of an engine E via a connection pipe 2. The connection pipe 2 has an upstream end portion 2*a* connected to the exhaust port of the engine E, a downstream end portion 2*b* connected to the muffler 1, and an upstream sensor support portion 2*c* provided at the downstream end portion 2*b*. An exhaust gas sensor 5 that detects a state of exhaust gas on an upstream side in a flow direction X of the exhaust gas with respect to a catalyst unit 3 can be attached to the upstream sensor support portion 2*c*.

The muffler 1 shown in FIGS. 1 to 5 includes the catalyst unit 3, a connection pipe 4, the exhaust gas sensor 5, an outer cylinder 6, a design cover 7, a muffler end 8, a first baffle plate 11, a first downstream pipe 12, a second baffle plate 13, a second downstream pipe 14, and a third baffle plate 15. The muffler end 8 is a member configuring a downstream end portion of the muffler 1.

Figure 5:
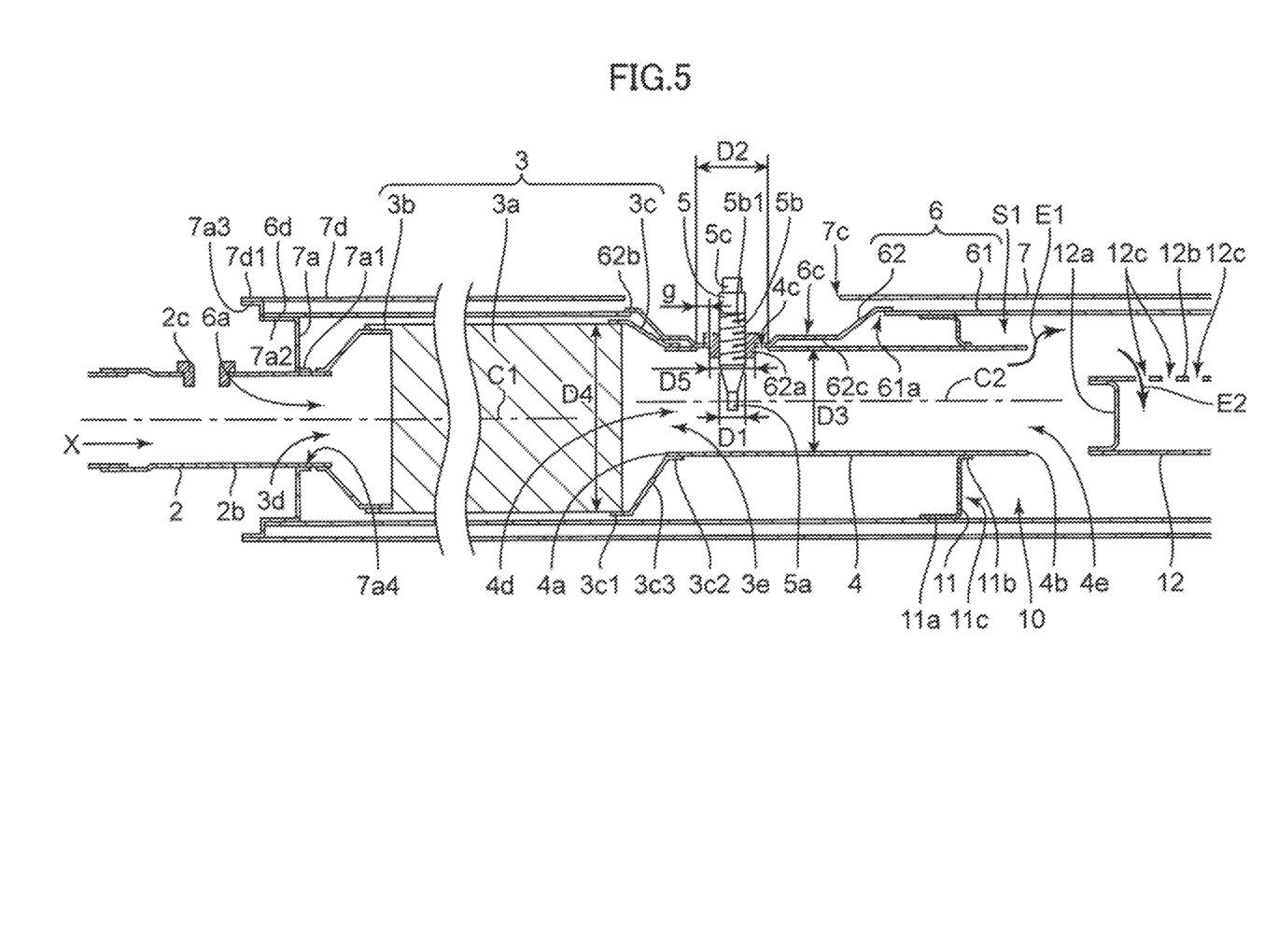
FIG. 5 is a cross-sectional view taken along line V-V of FIG. 4.

The catalyst unit 3 is a unit having a catalyst 3*a* that purifies the exhaust gas discharged from the engine E. Specifically, as shown in FIG. 5, the catalyst unit 3 includes the catalyst 3*a*, an upstream support portion 3*b*, and a downstream support portion 3*c*. The catalyst 3*a* contains a metal such as platinum as a substance for purifying harmful components contained in the exhaust gas. The upstream support portion 3*b* is a portion that supports an upstream end portion of the catalyst 3*a*, and is a tapered portion that forms an inlet 3*d* of the catalyst unit 3 and expands radially outward from the inlet 3*d* toward the downstream side in the flow direction X. The portion forming the above-described inlet 3*d* in the upstream support portion 3*b* is joined to the downstream end portion 2*b* of the connection pipe 2 by welding or the like. The downstream support portion 3*c* is a portion that supports a downstream end portion of the catalyst 3*a*, and is a tapered portion that forms an outlet 3*e* of the catalyst unit 3 and reduces a diameter radially inward toward the outlet 3*e* toward the downstream side in the flow direction X.

The downstream support portion 3*c* specifically includes a catalyst support portion 3*c*1 that supports the downstream end portion of the catalyst 3*a*, a pipe press-fitting portion 3*c*2 into which an upstream end portion 4*a* of the connection pipe 4 is press-fitted, and a reduced diameter portion 3c3 that reduces radially inward from the catalyst support portion 3c1 toward the pipe press-fitting portion 3c2. A diameter of the reduced diameter portion 3c3 reduces toward the downstream side until the reduced diameter portion 3c3 reaches the exhaust gas sensor 5 from the catalyst 3a, in other words, until the reduced diameter portion 3c3 reaches a portion where a first opening 4c of the connection pipe 4 is formed, from the catalyst 3a.

The connection pipe 4 is connected to the downstream side of the catalyst unit 3 in the flow direction X. Specifically, the upstream end portion 4a of the connection pipe 4 is press-fitted into the outlet 3e of the catalyst unit 3. The outlet 3e of the catalyst unit 3 is formed in the pipe press-fitting portion 3c2 of the downstream support portion 3c.

Since the upstream end portion 4a of the connection pipe 4 is press-fitted into the outlet 3e of the catalyst unit 3, the connection pipe 4 and the catalyst unit 3 can be relatively displaced from each other. As a result, it is possible to allow relative displacement caused by a thermal expansion difference between the catalyst unit 3 and the connection pipe 4, and it is possible to suppress a stress caused by the thermal expansion difference between the catalyst unit 3 and the connection pipe 4.

The term "press fitting" in the present embodiment means that the catalyst unit 3 and the connection pipe 4 are press-fitted by fitting so as to be relatively displaceable at the time of thermal expansion by receiving a thermal stress due to heat of the exhaust gas. In addition, "press fitting" means that bonding by welding or the like that hinders relative displacement is not performed.

Since the upstream end portion 4a of the connection pipe 4 is merely press-fitted into the outlet 3e of the catalyst unit 3 and has no welded portion, the exhaust gas sensor 5 can be brought close to the catalyst 3a, and measurement with a higher accuracy can be performed.

Since the upstream end portion 4a of the connection pipe 4 is merely press-fitted into the outlet 3e of the catalyst unit 3, there is a possibility that the exhaust gas slightly flows out from a gap between the upstream end portion 4a of the connection pipe 4 and the outlet 3e of the catalyst unit 3 to an outer peripheral side of the connection pipe 4. However, the outflow of a small amount of exhaust gas does not affect the measurement of the exhaust gas sensor 5.

A downstream end portion 4b of the connection pipe 4 is a portion on a downstream side of the upstream end portion 4a, and is fixed to another member around the connection pipe 4, that is, the first baffle plate 11 in the present embodiment. The downstream end portion 4b is connected to the outer cylinder 6 via the first baffle plate 11.

Figure 4:
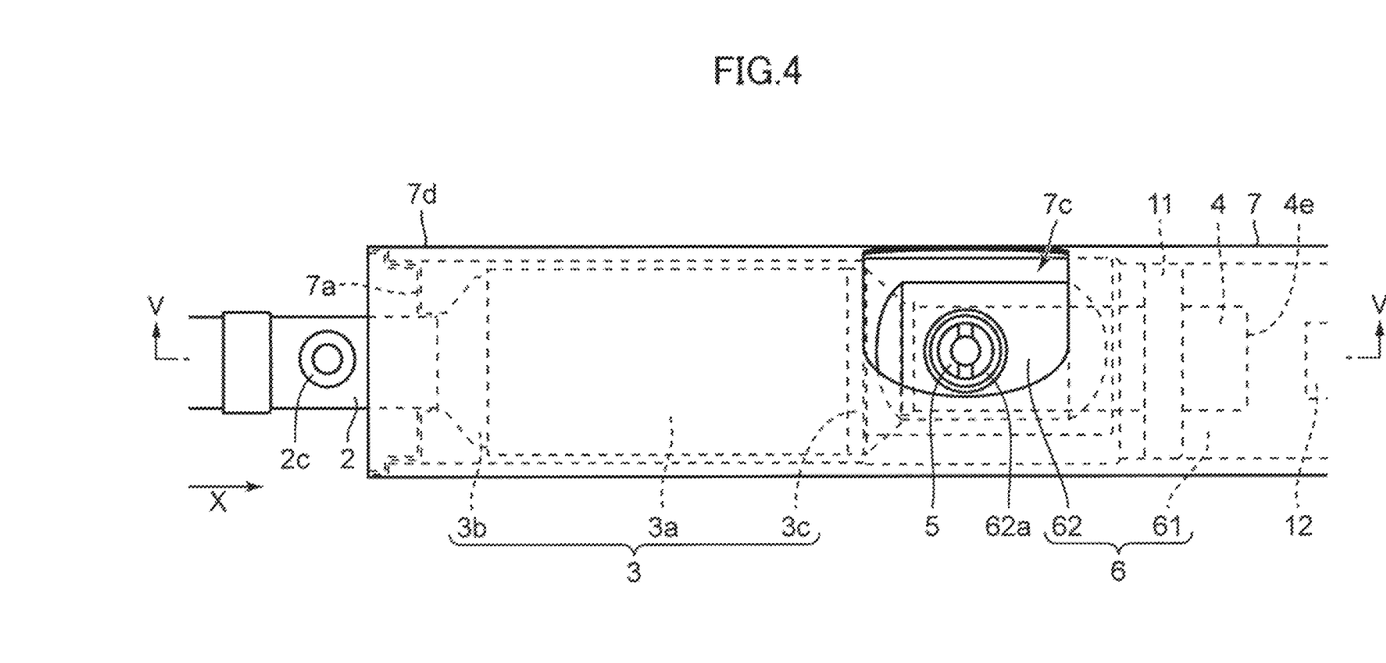
FIG. 4 is an enlarged view of the catalyst unit, the exhaust gas sensor, and the peripheral portion thereof as viewed from an extension line of an upper end of the exhaust gas sensor of FIG. 1.

As shown in FIG. 5, an axial center C2 of the connection pipe 4 is disposed offset from an axial center C1 of the outer cylinder 6 in a direction in which the first opening 4c approaches a nut 62a that is a support portion supporting the exhaust gas sensor 5 in the outer cylinder 6, that is, upward in FIG. 4. Therefore, a distance between the first opening 4c and the nut 62a can be shortened, and accordingly, a length of the exhaust gas sensor 5 inserted into the first opening 4c of the connection pipe 4 while being fixed to the nut 62a of the outer cylinder 6 can be shortened. That is, the existing exhaust gas sensor 5 can be easily applied.

As shown in FIG. 5, the first opening 4c having an opening diameter D2 larger than an outer diameter D1 of the exhaust gas sensor 5 is formed on a peripheral surface of the connection pipe 4.

The first opening 4c is disposed at a position closer to the upstream end portion 4a than the downstream end portion 4b of the connection pipe 4.

In addition, in the present embodiment, an outer diameter D3 of a portion of the connection pipe 4 where the first opening 4c, in which the exhaust gas sensor 5 is disposed, is formed is smaller than a diameter D4 of the catalyst 3a. As described above, the catalyst unit 3 has the reduced diameter portion 3c3 whose diameter reduces toward the downstream side from the catalyst 3a to the exhaust gas sensor 5. With this configuration, the exhaust gas after passing through the catalyst 3a can be collected by the reduced diameter portion 3c3 and guided to the exhaust gas sensor 5 inserted into the first opening 4c of the connection pipe 4, and detection accuracy of the exhaust gas can be easily improved. Note that the reduced diameter portion may be formed at the upstream end portion 4a of the connection pipe 4 instead of the catalyst unit 3.

The exhaust gas sensor 5 has a detection element 5a, an attachment portion 5b, and an output terminal 5c. The detection element 5a is a detection portion that detects a state of the exhaust gas flowing inside the connection pipe 4. The attachment portion 5b has a male screw portion 5b1 on a peripheral surface thereof. The male screw portion 5b1 of the exhaust gas sensor 5 is inserted into the nut 62a of the outer cylinder 6 and is screwed into a female screw portion formed on an inner peripheral surface of the nut 62a. As a result, the exhaust gas sensor 5 is fixed to the nut 62a of the outer cylinder 6 in a state where the detection element 5a is inserted into the inside of the connection pipe 4 through the first opening 4c.

The exhaust gas sensor 5 is inserted into the inside of the connection pipe 4 through the first opening 4c having the opening diameter D2 larger than the outer diameter D1 of the exhaust gas sensor 5. Therefore, the exhaust gas sensor 5 and the connection pipe 4 are formed at an interval g in a radial direction. Therefore, the connection pipe 4 and the exhaust gas sensor 5 can be relatively displaced from each other. As a result, it is possible to allow the relative displacement caused by a thermal expansion difference between the connection pipe 4 and the outer cylinder 6, and it is possible to suppress a stress caused by the thermal expansion difference generated between the connection pipe 4 and the outer cylinder 6.

The detection element 5a is an $O_2$ sensor that detects an oxygen concentration of the exhaust gas, an air flow sensor that detects a flow rate of the exhaust gas, or the like, the oxygen concentration and the flow rate being exemplified as the state of the exhaust gas.

The output terminal 5c protrudes outward from the outer cylinder 6 and is exposed to an outside through an opening window 7c of the design cover 7, and is electrically connected to a controller for external engine control or the like. The output terminal 5c transmits, to the controller, a signal related to the state of the exhaust gas detected by the detection element 5a.

Figure 1:
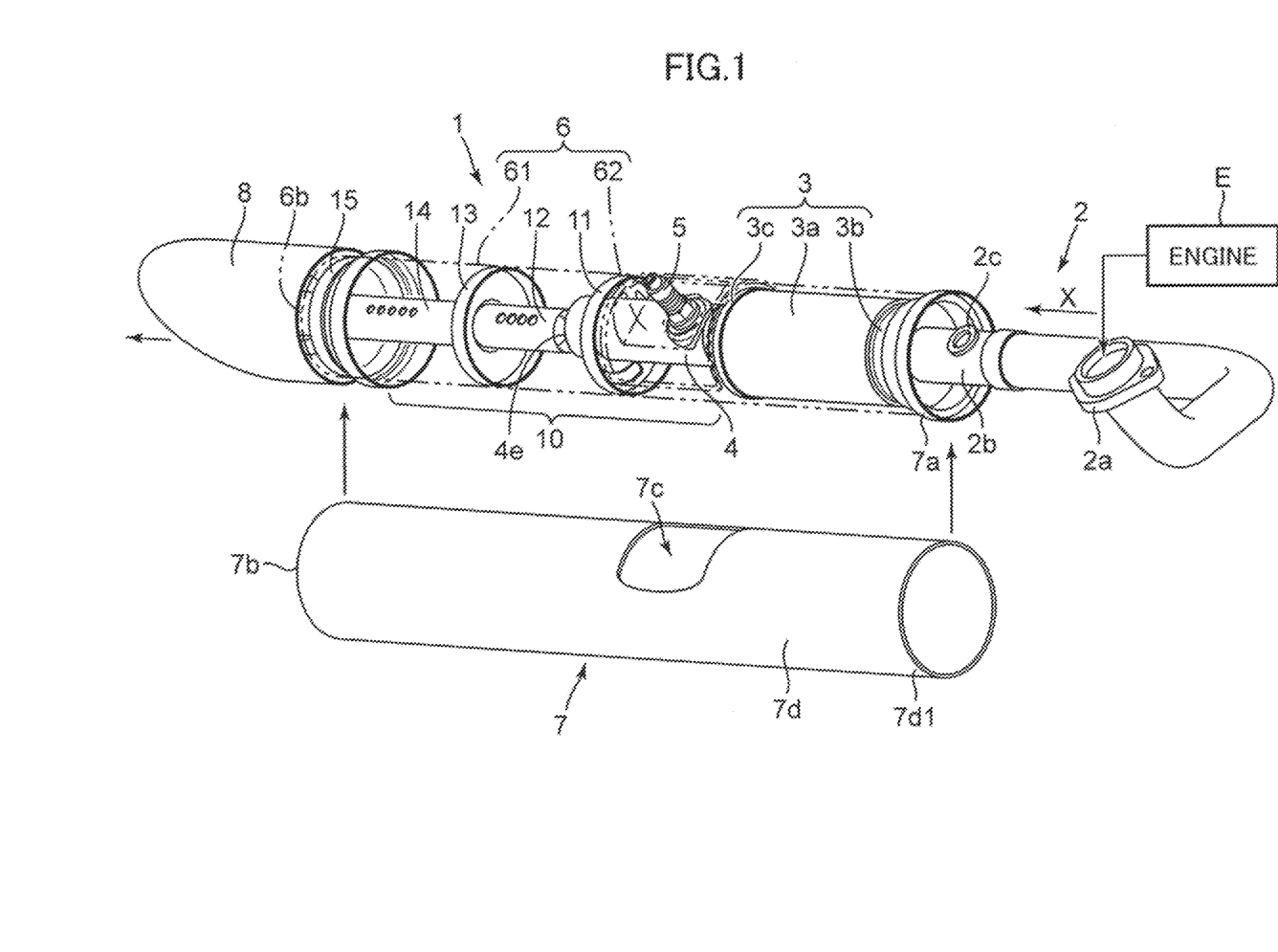
FIG. 1 is a partially exploded perspective view showing an overall configuration of a muffler of a motorcycle as one example of an exhaust device according to an embodiment of the present disclosure.

The outer cylinder 6 covers at least an outer periphery of the connection pipe 4. In the present embodiment, the outer cylinder 6 covers outer peripheries of the catalyst unit 3, the connection pipe 4, the first baffle plate 11, the first downstream pipe 12, the second baffle plate 13, the second downstream pipe 14, and the third baffle plate 15. As shown in FIG. 1, an outlet 6b of the outer cylinder 6 is disposed at a position downstream of an outlet 4e of the connection pipe 4, specifically, at a position downstream of the third baffle plate 15. With this configuration, even if the exhaust gas leaks from a gap between the exhaust gas sensor 5 and the connection pipe 4 or a gap between the connection pipe 4 and the catalyst unit 3, the exhaust gas is covered with the outer cylinder 6, so that it is possible to prevent the exhaust gas from leaking to the outside from other than the outlet 6b of the outer cylinder 6.

The outer cylinder 6 includes an outer cylinder main body 61 in which a second opening 61a communicating with the first opening 4c of the connection pipe 4 is formed, and a lid member 62 that closes the second opening 61a.

The lid member 62 has a central portion 62c and a peripheral edge portion 62b. The central portion 62c has the nut 62a and is recessed radially inward with respect to the outer cylinder main body 61, which is the other portion of the outer cylinder 6. Thus, a recess 6c of the outer cylinder 6 is formed. The nut 62a is joined to the central portion 62c of the lid member 62 by welding or the like. The nut 62a is a support portion that supports the exhaust gas sensor 5 in the state where the exhaust gas sensor 5 is inserted into the first opening 4c of the connection pipe 4.

Since the peripheral edge portion 62b is a portion surrounding a periphery of the central portion 62c and is joined to a peripheral edge of the second opening 61a of the outer cylinder main body 61 by welding, there is no leakage of the exhaust gas from the second opening 61a to the outside of the outer cylinder 6.

In the present embodiment, the outer cylinder 6 has the recess 6c recessed radially inward at the portion where the exhaust gas sensor 5 is fixed. Therefore, a distance from a position of attachment to the outer cylinder 6 to the detection element 5a can be shortened, and the exhaust gas sensor 5 can be prevented from becoming long.

Moreover, the central portion 62c of the lid member 62 has the nut 62a, and is recessed radially inward from the outer cylinder main body 61 to form the recess 6c. Therefore, the recess 6c in the outer cylinder 6 for fixing the exhaust gas sensor 5 is easily formed. In addition, the presence of the recess 6c in the outer cylinder 6 for fixing the exhaust gas sensor 5 makes it easy to bring a tool such as a wrench close to the exhaust gas sensor 5 when the exhaust gas sensor 5 is attached or detached.

In the present embodiment, the opening diameter D2 of the first opening 4c of the connection pipe 4 is set to be larger than an outer diameter D5 of the nut 62a of the outer cylinder 6. In other words, a gap g is formed between an inner peripheral edge of the first opening 4c and an outer peripheral edge of the nut 62a. As a result, an attachment margin of the lid member 62 can be increased, and the attachment position of the exhaust gas sensor 5 to the outer cylinder 6 can be easily adjusted according to a surrounding situation and the like.

Figure 6:
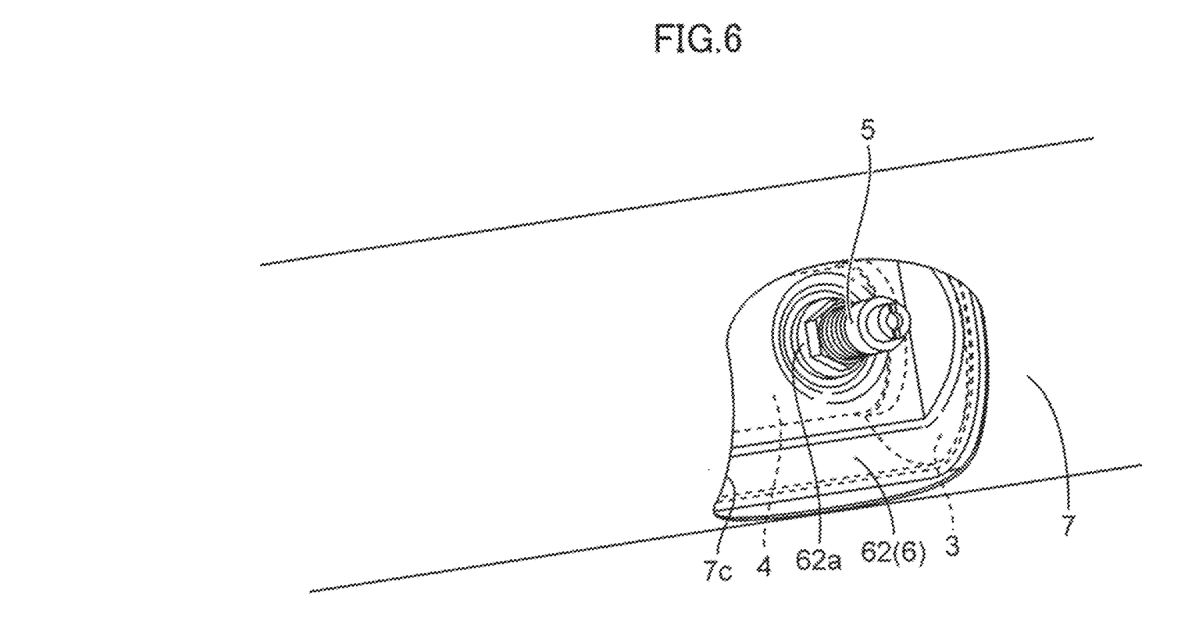
FIG. 6 is a perspective explanatory view showing a state where the exhaust gas sensor is seen from an outside through an opening window of a design cover of FIG. 1.
Figure 7:
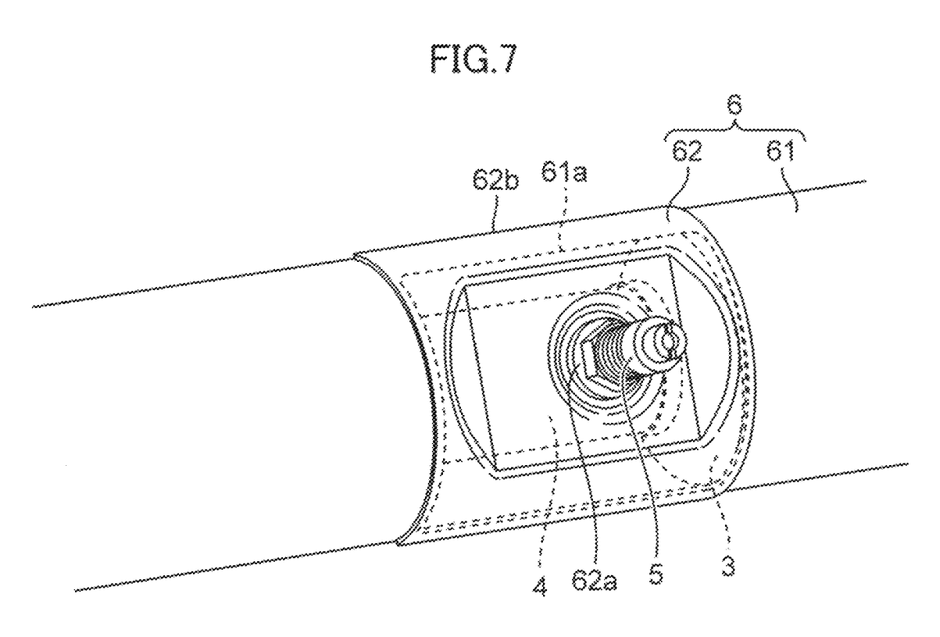
FIG. 7 is a perspective explanatory view showing a state where the design cover of FIG. 6 is removed and an outer cylinder main body and the lid member configuring the outer cylinder together with the exhaust gas sensor are visible from the outside.
Figure 8:
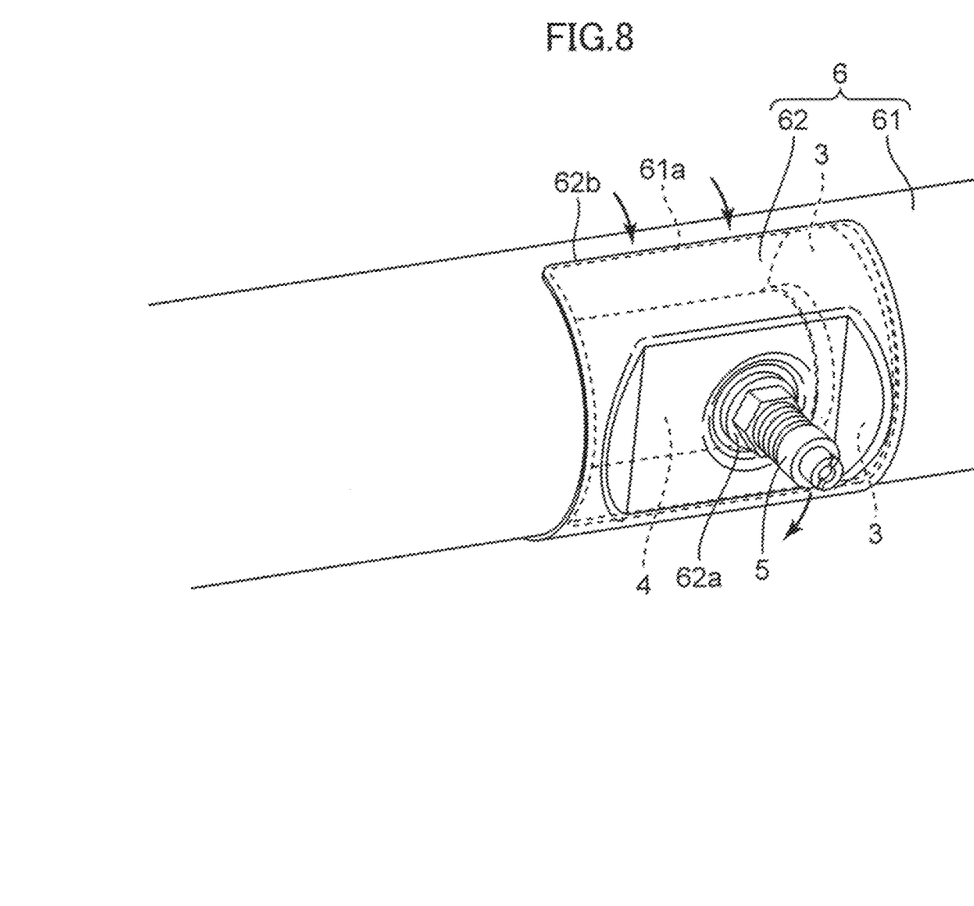
FIG. 8 is a perspective explanatory view showing a state where the exhaust gas sensor and the lid member of FIG. 7 are shifted downward in a circumferential direction with respect to the outer cylinder main body.

For example, as shown in FIGS. 6 to 8, the outer cylinder 6 accommodated in the design cover 7 can vary a direction of the exhaust gas sensor 5 by using the common outer cylinder 6. Specifically, as shown in FIGS. 7 to 8, the lid member 62 in which the exhaust gas sensor 5 is fixed to the nut 62a can be adjusted in position in a vertical direction along a circumferential direction of the outer cylinder main body 61 in a range where the lid member 62 closes the second opening 61a of the outer cylinder main body 61. As a result, the direction of the exhaust gas sensor 5 can be changed.

The first baffle plate 11 is a support member that supports a portion of the connection pipe 4 on the downstream side of the first opening 4c.

As shown in FIG. 5, the first baffle plate 11 is a disk-shaped member with a hole at a center, and has an outer peripheral-side portion 11a joined to an inner peripheral surface of the outer cylinder 6, an inner peripheral-side portion 11b joined to an outer peripheral surface of the connection pipe 4, and an opening portion 11c that opens in the flow direction X. With this configuration, the first baffle plate 11 connects the inner peripheral surface of the outer cylinder 6 and the outer peripheral surface of the connection pipe 4, and regulates a flow E1 of the exhaust gas in a space portion S1 between the outer cylinder 6 and the connection pipe 4.

Since the muffler 1 includes the first baffle plate 11, the upstream end portion 4a of the connection pipe 4 is press-fitted into the catalyst unit 3, and a portion on the downstream side of the first opening 4c is supported by the first baffle plate 11. In this configuration, the connection pipe 4 is in a state supported at both ends, that is, supported on the upstream side and the downstream side of the first opening 4c. Accordingly, even when the connection pipe 4 is elongated, a supporting strength of the connection pipe 4 can be improved. As a result, a distance from the exhaust gas sensor 5 to the outlet 4e of the connection pipe 4 can be easily increased, and the exhaust gas flowing backward from the outlet 4e of the connection pipe 4 to the exhaust gas sensor 5 can be suppressed.

The first baffle plate 11 supporting the connection pipe 4 regulates the flow of the exhaust gas in the space portion S1 between the outer cylinder 6 and the connection pipe 4, so that the exhaust gas can be silenced.

The first downstream pipe 12 is a pipe disposed downstream of the downstream end portion 4b of the connection pipe 4. As shown in FIG. 5, the first downstream pipe 12 has a closed upstream end portion 12a and a peripheral surface 12b having a plurality of vent holes 12c. With this configuration, the exhaust gas that has passed through the connection pipe 4 collides with the closed upstream end portion 12a of the first downstream pipe 12 and is then divided into the flow E1 toward the space portion S1 between the connection pipe 4 and the outer cylinder 6 while being regulated by the first baffle plate 11, and a flow E2 toward an inside of the first downstream pipe 12 through the vent holes 12c of the peripheral surface 12b of the first downstream pipe 12, so that the exhaust gas is effectively silenced by being suddenly enlarged and suddenly reduced.

In addition, in the present embodiment, the exhaust gas sensor 5 is inserted into the first opening 4c to be disposed at the position closer to the upstream end portion 4a than the downstream end portion 4b of the connection pipe 4. The upstream end portion 12a of the first downstream pipe 12 on the downstream side of the connection pipe 4 is closed. Therefore, a risk that pulsation of the exhaust gas having passed through the connection pipe 4 affects the measurement of the exhaust gas sensor is reduced, and the detection accuracy is improved.

Figure 2:
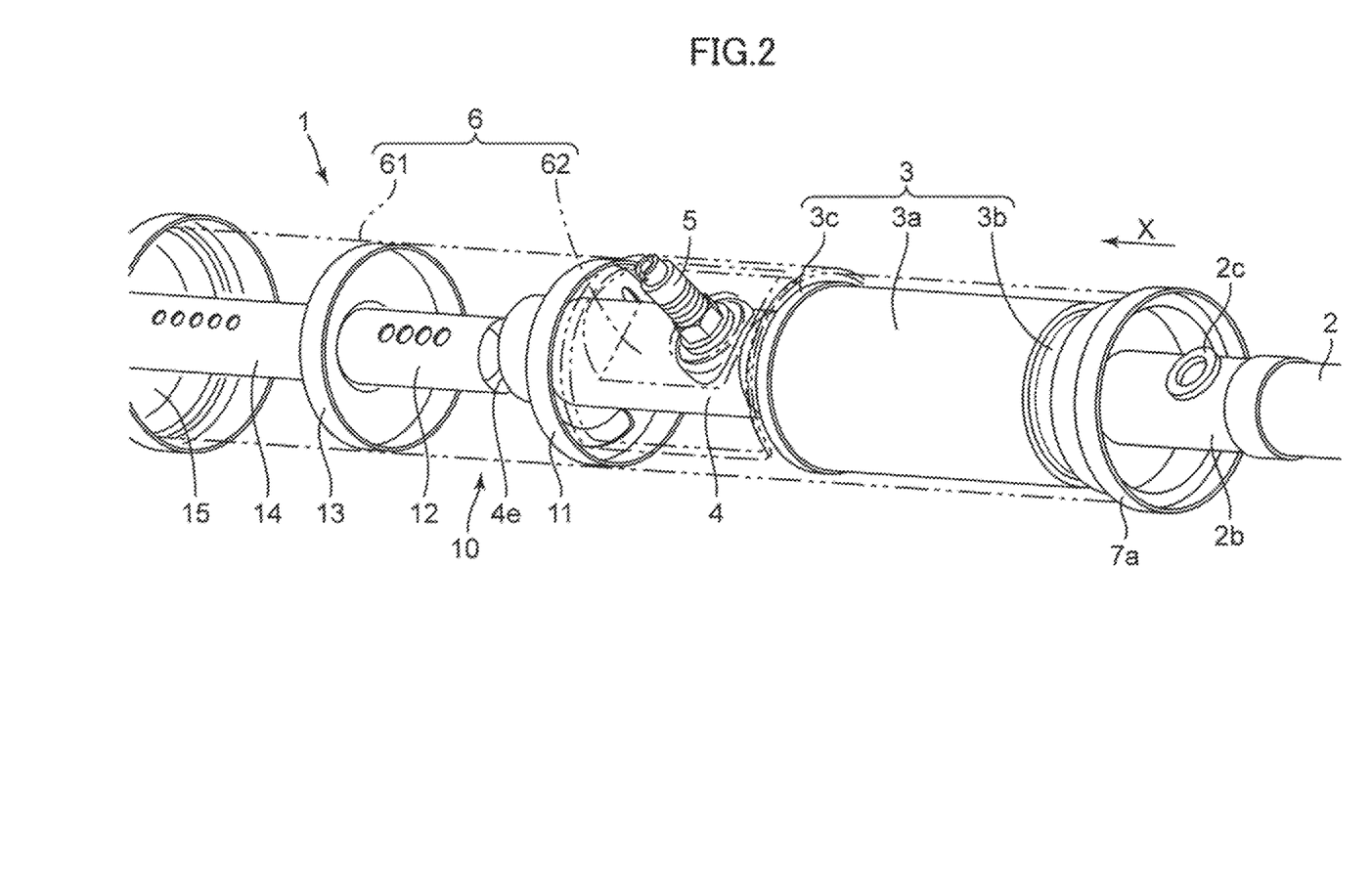
FIG. 2 is an enlarged perspective view of a catalyst unit, an exhaust gas sensor, and a peripheral portion thereof in FIG. 1.
Figure 3:
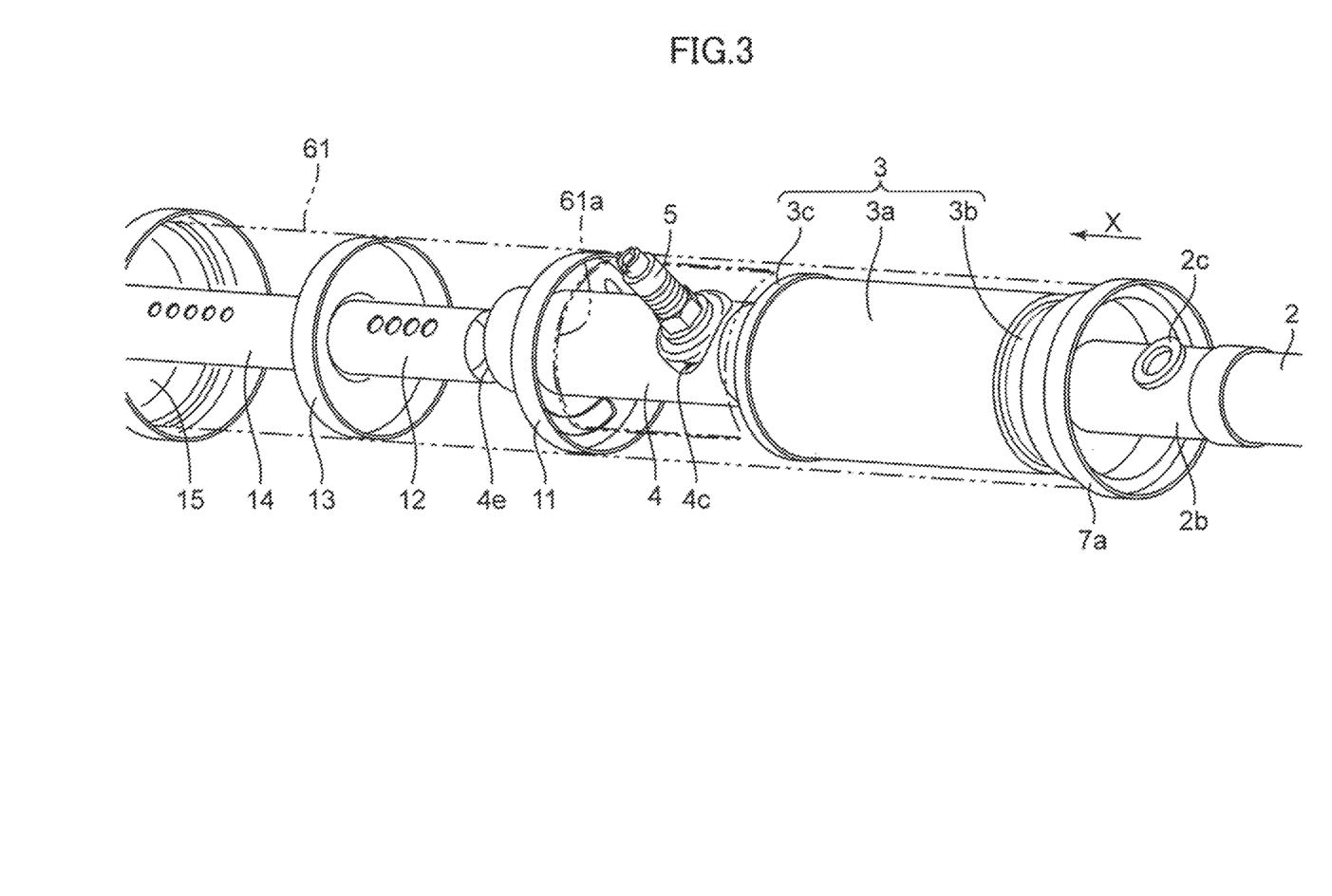
FIG. 3 is an enlarged perspective view of a state where a lid member of an outer cylinder of FIG. 2 is removed.

As shown in FIGS. 1 to 3, the second baffle plate 13 is a disk-shaped member having a hole at a center similarly to the first baffle plate 11. The second baffle plate 13 connects the inner peripheral surface of the outer cylinder 6 and an outer peripheral surface of the first downstream pipe 12, and regulates the flow of the exhaust gas in a space portion between the outer cylinder 6 and the first downstream pipe 12.

The second downstream pipe 14 is a pipe disposed downstream of a downstream end portion of the first downstream pipe 12. Similarly to the first downstream pipe 12, the second downstream pipe 14 has a closed upstream end portion and a peripheral surface having a plurality of vent holes.

Similarly to the first baffle plate 11, the third baffle plate 15 is a disk-shaped member with a hole at a center. The third baffle plate 15 connects the inner peripheral surface of the outer cylinder 6 and an outer peripheral surface of the second downstream pipe 14, and regulates a flow of the exhaust gas in a space portion between the outer cylinder 6 and the second downstream pipe 14.

In the present embodiment, the outer cylinder 6 accommodates the catalyst unit 3 inside the outer cylinder 6 and forms a sound deadening chamber 10 for reducing kinetic energy of the exhaust gas. In this configuration, the exhaust gas is silenced by the sound deadening chamber 10 formed inside the outer cylinder 6, and the catalyst unit 3 is hardly visually recognized from the outside, so that degradation in aesthetic appearance by the catalyst unit 3 can be prevented.

Specifically, as shown in FIGS. 2 and 5, the sound deadening chamber 10 of the present embodiment is formed of the connection pipe 4, the outer cylinder 6, the first baffle plate 11, the first downstream pipe 12, the second baffle plate 13, the second downstream pipe 14, and the third baffle plate 15.

The catalyst unit 3 is accommodated in the outer cylinder 6 together with the connection pipe 4, the first baffle plate 11, and the other members configuring the sound deadening chamber 10. This makes it difficult to visually recognize the catalyst unit 3 from the outside and prevent degradation in aesthetic appearance, and makes it possible to form the sound deadening chamber 10 in a limited space inside the outer cylinder 6. Therefore, downsizing of the exhaust device can be achieved.

The design cover 7 is a cylindrical member made of resin or metal that covers the outer periphery of the outer cylinder 6 to improve design and heat insulation properties. The design cover 7 has a cylindrical main body portion 7d and a disk-shaped upstream lid portion 7a that closes an upstream end portion 7d1 of the main body portion 7d. The main body portion 7d has an open downstream end portion 7b and the opening window 7c. As shown in FIG. 5, the upstream lid portion 7a of the design cover 7 is a disk-shaped portion having an opening 7a4 at a center of the upstream lid portion 7a, and has an inner joint portion 7a1, an intermediate joint portion 7a2, and an outer joint portion 7a3. The inner joint portion 7a1 is a flange portion forming a peripheral edge of the opening 7a4, and is joined to an outer peripheral surface of the downstream end portion 2b of the connection pipe 2 by welding or the like. The intermediate joint portion 7a2 is a step-shaped portion formed in a region between an inner peripheral edge and an outer peripheral edge of the upstream lid portion 7a, and is joined to an inner peripheral surface of an upstream end portion 6d of the outer cylinder 6 by welding or the like. The outer joint portion 7a3 is a flange portion forming the outer peripheral edge of the upstream lid portion 7a, and is joined to an inner peripheral surface of the upstream end portion 7d1 of the main body portion 7d by welding or the like. The downstream end portion 7b of the main body portion 7d is joined to the muffler end 8 shown in FIG. 1 by welding or the like. The opening window 7c is formed on a peripheral surface of the main body portion 7d of the design cover 7, and is disposed at a position corresponding to the attachment position of the exhaust gas sensor 5 in the outer cylinder 6. As a result, an external controller can be electrically connected to the exhaust gas sensor 5 through the opening window 7c.

SUMMARY OF THE PRESENT DISCLOSURE

An exhaust device according to one aspect of the present disclosure includes: a catalyst unit having a catalyst that purifies exhaust gas discharged from an engine; a connection pipe connected to the catalyst unit on a downstream side in a flow direction of the exhaust gas; an exhaust gas sensor having a detection portion that detects a state of the exhaust gas flowing inside the connection pipe; and an outer cylinder that covers an outer periphery of the connection pipe, wherein an upstream end portion of the connection pipe is press-fitted into an outlet of the catalyst unit, the connection pipe is fixed to another member around the connection pipe at a position downstream of the upstream end portion, a first opening having an opening diameter larger than an outer diameter of the exhaust gas sensor is formed on a peripheral surface of the connection pipe, and the exhaust gas sensor is fixed to the outer cylinder in a state where the detection portion is inserted into an inside of the connection pipe through the first opening.

According to the first aspect, the upstream end portion of the connection pipe is press-fitted into the outlet of the catalyst unit, so that the connection pipe and the catalyst unit can be relatively displaced from each other. As a result, it is possible to allow relative displacement caused by a thermal expansion difference between the catalyst unit and the connection pipe, and it is possible to suppress a stress caused by the thermal expansion difference between the catalyst unit and the connection pipe.

In addition, the exhaust gas sensor is inserted into the inside of the connection pipe through the first opening having the opening diameter larger than the outer diameter of the exhaust gas sensor. Therefore, the exhaust gas sensor and the connection pipe are formed at an interval g in a radial direction. Therefore, the connection pipe and the exhaust gas sensor can be relatively displaced from each other. As a result, it is possible to allow relative displacement caused by a thermal expansion difference between the connection pipe and the outer cylinder, and it is possible to suppress a stress caused by the thermal expansion difference between the connection pipe and the outer cylinder.

According to an exhaust device according to a second aspect of the present disclosure, in the exhaust device according to the first aspect, the outer cylinder covers an outer periphery of the catalyst unit and the outer periphery of the connection pipe, and an outlet of the outer cylinder is disposed at a position downstream of an outlet of the connection pipe.

According to the second aspect, even if the exhaust gas leaks from a gap between the exhaust gas sensor and the connection pipe or a gap between the connection pipe and the catalyst unit, the exhaust gas is covered with the outer cylinder, so that the exhaust gas can be prevented from leaking outward from a portion other than the outlet of the outer cylinder.

According to an exhaust device according to a third aspect of the present disclosure, in the exhaust device according to the first or second aspect, an outer diameter of a portion of the connection pipe where the first opening, in which the exhaust gas sensor is disposed, is formed is smaller than a diameter of the catalyst, and the catalyst unit or the connection pipe has a reduced diameter portion that reduces in diameter toward the downstream side from the catalyst to the exhaust gas sensor.

According to the third aspect, the exhaust gas after passing through the catalyst can be collected at the reduced diameter portion and guided to the exhaust gas sensor inserted in the first opening of the connection pipe, and a detection accuracy of the exhaust gas can be easily improved.

According to an exhaust device according to a fourth aspect of the present disclosure, in the exhaust device according to any one of the first to third aspects, an axial center of the connection pipe is disposed offset from an axial center of the outer cylinder in a direction in which the first opening approaches a support portion that supports the exhaust gas sensor in the outer cylinder.

According to the fourth aspect, the connection pipe is disposed offset from the axial center of the outer cylinder in the direction in which the first opening of the connection pipe approaches the support portion supporting the exhaust gas sensor in the outer cylinder, so that a distance between the first opening and the support portion can be shortened, and accordingly, a length of the exhaust gas sensor inserted into the first opening of the connection pipe while being fixed to the support portion of the outer cylinder can be shortened. This facilitates application of an existing exhaust gas sensor.

According to an exhaust device according to a fifth aspect of the present disclosure, in the exhaust device according to any one of the first to fourth aspects, a portion of the outer cylinder to which the exhaust gas sensor is fixed is recessed radially inward with respect to another portion of the outer cylinder.

According to the fifth aspect, the distance from the attachment position to the outer cylinder to the detection portion can be shortened, and the exhaust gas sensor can be prevented from becoming long.

According to an exhaust device according to a sixth aspect of the present disclosure, in the exhaust device according to the fifth aspect, the outer cylinder includes: an outer cylinder main body in which a second opening communicating with the first opening of the connection pipe is formed; and a lid member that closes the second opening, the lid member includes: a central portion having a support portion that supports the exhaust gas sensor in a state where the exhaust gas sensor is inserted into the first opening, the central portion being recessed radially inward from the outer cylinder main body; and a peripheral edge portion joined to a peripheral edge of the second opening of the outer cylinder main body.

According to the sixth aspect, the recessed portion in the outer cylinder for fixing the exhaust gas sensor is easily formed.

An exhaust device according to a seventh aspect of the present disclosure, in the exhaust device according to any one of the first to sixth aspect, further includes a support member that supports a portion of the connection pipe on a downstream side of the first opening.

According to the seventh aspect, by providing the support member, the upstream end portion of the connection pipe is press-fitted into the catalyst unit, and the portion on the downstream side of the first opening is supported by the support member, so that the connection pipe is in a state of being supported at both ends, that is, supported on the upstream side and the downstream side of the first opening. Accordingly, even when the connection pipe is elongated, a supporting strength of the connection pipe can be improved. As a result, a distance from the exhaust gas sensor to the outlet of the connection pipe can be easily increased, and the exhaust gas flowing backward from the outlet of the connection pipe to the exhaust gas sensor can be suppressed.

According to an exhaust device according to an eighth aspect of the present disclosure, in the exhaust device according to the seventh aspect, the support member is a baffle plate that connects an inner peripheral surface of the outer cylinder and an outer peripheral surface of the connection pipe and regulates a flow of the exhaust gas in a space portion between the outer cylinder and the connection pipe.

According to the eighth aspect, since the support member that supports the connection pipe is the baffle plate, the flow of the exhaust gas in the space portion between the outer cylinder and the connection pipe is regulated by the baffle plate, and the exhaust gas can be silenced.

An exhaust device according to a ninth aspect of the present disclosure, in the exhaust device according to the eighth aspect, further includes a downstream pipe disposed downstream of a downstream end portion of the connection pipe, the downstream pipe has a closed upstream end portion and a peripheral surface having a plurality of vent holes, and the first opening is disposed at a position closer to the upstream end portion than the downstream end portion of the connection pipe.

According to the ninth aspect, since the downstream pipe disposed on the downstream side of the connection pipe has the closed upstream end portion and the peripheral surface having the plurality of vent holes, the exhaust gas having passed through the connection pipe is effectively silenced by colliding with the closed upstream end portion of the downstream pipe, and then being divided into a flow toward the space portion between the connection pipe and the outer cylinder while being regulated by the baffle plate, and a flow toward an inside of the downstream pipe through the vent holes on the peripheral surface of the downstream pipe, and performing rapid expansion and rapid contraction.

In addition, the exhaust gas sensor is inserted into the first opening to be disposed at a position closer to the upstream end portion than the downstream end portion of the connection pipe, and the upstream end portion of the downstream pipe on the downstream side of the connection pipe is closed. Therefore, a risk that pulsation of the exhaust gas having passed through the connection pipe affects measurement of the exhaust gas sensor is reduced, and the detection accuracy is improved.

According to an exhaust device according to a tenth aspect of the present disclosure, in the exhaust device according to any one of the first to ninth aspects, the outer cylinder accommodates the catalyst unit and forms a sound deadening chamber for reducing kinetic energy of the exhaust gas inside the outer cylinder.

According to the tenth aspect, the exhaust gas is silenced by the sound deadening chamber formed inside the outer cylinder, and the catalyst unit is hardly visually recognized from the outside, so that it is possible to prevent degradation in aesthetic appearance by the catalyst unit.

According to an exhaust device according to an eleventh aspect of the present disclosure, in the exhaust device according to the tenth aspect, the sound deadening chamber is formed of: the outer cylinder; the connection pipe; and a baffle plate that connects the inner peripheral surface of the outer cylinder and the outer peripheral surface of the connection pipe and regulates the flow of the exhaust gas in a space portion between the outer cylinder and the connection pipe, and the catalyst unit is accommodated in the outer cylinder together with the connection pipe and the baffle plate.

According to the eleventh aspect, the catalyst unit is accommodated in the outer cylinder together with the connection pipe and the baffle plate that form the sound deadening chamber, so that the catalyst unit is hardly visually recognized from the outside, degradation in aesthetic appearance is prevented, and the sound deadening chamber can be formed in a limited space inside the outer cylinder. Therefore, downsizing of the exhaust device can be achieved.

This application is based on Japanese Patent application No. 2023-186785 filed in Japan Patent Office on Oct. 31, 2023, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An exhaust device comprising:
a catalyst unit including a catalyst that purifies exhaust gas discharged from an engine;
a connection pipe connected to the catalyst unit on a downstream side in a flow direction of the exhaust gas;
an exhaust gas sensor including a detection portion that detects a state of the exhaust gas flowing inside the connection pipe; and
an outer cylinder that covers an outer periphery of the connection pipe,
wherein an upstream end portion of the connection pipe is press-fitted into an outlet of the catalyst unit,
the connection pipe is fixed to another member around the connection pipe at a position downstream of the upstream end portion,
a peripheral surface of the connection pipe includes a first opening including an opening diameter larger than an outer diameter of the exhaust gas sensor, and
the exhaust gas sensor is fixed to the outer cylinder in a state where the detection portion is inserted into an inside of the connection pipe through the first opening so that the exhaust gas sensor and the connection pipe are at an interval in a radial direction of the exhaust gas sensor.

2. The exhaust device according to claim 1, wherein:
the outer cylinder covers an outer periphery of the catalyst unit and the outer periphery of the connection pipe,
an outlet of the outer cylinder is disposed at a position downstream of an outlet of the connection pipe, and
the connection pipe and the exhaust gas sensor is relatively displaceable from each other.

3. The exhaust device according to claim 1, wherein;
an outer diameter of a portion of the connection pipe where the first opening, in which the exhaust gas sensor is disposed, is smaller than a diameter of the catalyst, and
the catalyst unit or the connection pipe includes a reduced diameter portion that reduces in diameter toward the downstream side from the catalyst to the exhaust gas sensor.

4. The exhaust device according to claim 1, wherein;
an axial center of the connection pipe is disposed offset from an axial center of the outer cylinder in a direction in which the first opening approaches a support portion that supports the exhaust gas sensor in the outer cylinder.

5. The exhaust device according to claim 1, wherein:
a portion of the outer cylinder to which the exhaust gas sensor is fixed is recessed radially inward with respect to another portion of the outer cylinder.

6. An exhaust device, comprising:
a catalyst unit including a catalyst that purifies exhaust gas discharged from an engine;
a connection pipe connected to the catalyst unit on a downstream side in a flow direction of the exhaust gas;
an exhaust gas sensor including a detection portion that detects a state of the exhaust gas flowing inside the connection pipe; and
an outer cylinder that covers an outer periphery of the connection pipe,
wherein:
an upstream end portion of the connection pipe is press-fitted into an outlet of the catalyst unit,
the connection pipe is fixed to another member around the connection pipe at a position downstream of the upstream end portion,
a peripheral surface of the connection pipe includes a first opening including an opening diameter larger than an outer diameter of the exhaust gas sensor,
the exhaust gas sensor is fixed to the outer cylinder in a state where the detection portion is inserted into an inside of the connection pipe through the first opening,
a portion of the outer cylinder to which the exhaust gas sensor is fixed is recessed radially inward with respect to another portion of the outer cylinder,
the outer cylinder includes:
an outer cylinder main body including a second opening communicating with the first opening of the connection pipe; and
a lid that closes the second opening,
the lid includes:
a central portion including a support portion that supports the exhaust gas sensor in a state where the exhaust gas sensor is inserted into the first opening, the central portion being recessed radially inward from the outer cylinder main body; and
a peripheral edge portion joined to a peripheral edge of the second opening of the outer cylinder main body.

7. The exhaust device according to claim 1, further comprising:
a support that supports a portion of the connection pipe on a downstream side of the first opening,
wherein the connection pipe is supported at both ends by the support and the catalyst unit on an upstream side.

8. The exhaust device according to claim 7, wherein:
the support is includes a baffle plate that connects an inner peripheral surface of the outer cylinder and an outer peripheral surface of the connection pipe and regulates a flow of the exhaust gas in a space portion between the outer cylinder and the connection pipe.

9. The exhaust device according to claim 8, further comprising:
a downstream pipe disposed downstream of a downstream end portion of the connection pipe,
wherein:
the downstream pipe includes a closed upstream end portion and a peripheral surface including a plurality of vent holes, and
the first opening is disposed at a position closer to the upstream end portion than the downstream end portion of the connection pipe.

10. The exhaust device according to claim 1, wherein;
the outer cylinder accommodates the catalyst unit and is a sound deadening chamber for reducing kinetic energy of the exhaust gas inside the outer cylinder.

11. An exhaust device, comprising:
a catalyst unit including a catalyst that purifies exhaust gas discharged from an engine:
a connection pipe connected to the catalyst unit on a downstream side in a flow direction of the exhaust gas;
an exhaust gas sensor including a detection portion that detects a state of the exhaust gas flowing inside the connection pipe; and
an outer cylinder that covers an outer periphery of the connection pipe,
wherein:
an upstream end portion of the connection pipe is press-fitted into an outlet of the catalyst unit,
the connection pipe is fixed to another member around the connection pipe at a position downstream of the upstream end portion,
a peripheral surface of the connection pipe includes a first opening including an opening diameter larger than an outer diameter of the exhaust gas sensor,
the exhaust gas sensor is fixed to the outer cylinder in a state where the detection portion is inserted into an inside of the connection pipe through the first opening,
the outer cylinder accommodates the catalyst unit and is a sound deadening chamber for reducing kinetic energy of the exhaust gas inside the outer cylinder,
the sound deadening chamber includes:
the outer cylinder;
the connection pipe; and
a baffle plate that connects an inner peripheral surface of the outer cylinder and an outer peripheral surface of the connection pipe and regulates the flow of the exhaust gas in a space portion between the outer cylinder and the connection pipe,
the catalyst unit is accommodated in the outer cylinder together with the connection pipe and the baffle plate, and
the connection pipe is supported at both ends by a support and the catalyst unit on an upstream side, the support supporting a portion of the connection pipe on a downstream side of the first opening.

12. The exhaust device according to claim 10, further comprising:
a gap between an inner peripheral edge of the first opening and a portion of the outer cylinder to which the exhaust gas sensor is attached.

13. The exhaust device according to claim 1, wherein:
the connection pipe and the outer cylinder are disconnected from each other at a position of the outer cylinder where the exhaust gas sensor is fixed to the outer cylinder.

14. The exhaust device according to claim 11, wherein:
the connection pipe and the outer cylinder are disconnected from each other at a position of the outer cylinder where the exhaust gas sensor is fixed to the outer cylinder.

15. The exhaust device according to claim 1, wherein:
the another member to which the connection pipe is fixed is a first baffle plate.

16. The exhaust device according to claim 6, wherein:
the support portion of the lid member comprises a nut joined to the central portion.

17. The exhaust device according to claim 1, wherein:
the opening diameter of the first opening is larger than an outer diameter of a support portion on the outer cylinder to which the exhaust gas sensor is fixed.

18. The exhaust device according to claim 8, wherein:
the baffle plate is a disk-shaped member.

19. The exhaust device according to claim 1, further comprising:
a cover that covers an outer periphery of the outer cylinder, the cover having an opening window disposed at a position corresponding to an attachment position of the exhaust gas sensor.

20. The exhaust device according to claim 1, wherein:
the exhaust gas sensor comprises one of an O2 sensor or an air flow sensor.

* * * * *